US012595747B2

(12) United States Patent
Theratil

(10) Patent No.: US 12,595,747 B2
(45) Date of Patent: Apr. 7, 2026

(54) METHOD OF MITIGATING VIBRATIONS IN A SEAL COMPONENT

(71) Applicant: PRATT & WHITNEY CANADA CORP., Longueuil (CA)

(72) Inventor: Ignatius Theratil, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/355,515

(22) Filed: Jul. 20, 2023

(65) Prior Publication Data

US 2025/0027428 A1      Jan. 23, 2025

(51) Int. Cl.
| | |
|---|---|
| *F01D 25/04* | (2006.01) |
| *F01D 25/16* | (2006.01) |
| *F02C 7/06* | (2006.01) |
| *F02C 7/28* | (2006.01) |
| *F16C 33/72* | (2006.01) |

(52) U.S. Cl.
CPC ............. *F01D 25/04* (2013.01); *F01D 25/16* (2013.01); *F02C 7/06* (2013.01); *F02C 7/28* (2013.01); *F16C 33/72* (2013.01); *F05D 2220/323* (2013.01); *F05D 2240/54* (2013.01); *F05D 2240/55* (2013.01); *F05D 2260/96* (2013.01); *F16C 2360/23* (2013.01)

(58) Field of Classification Search
CPC .......... F01D 25/04; F01D 25/16; F16C 33/72; F16C 2360/23; F05D 2220/323; F05D 2240/54; F05D 2240/55; F05D 2260/96; F16J 15/34; F16J 15/3404; F16J 15/3492
See application file for complete search history.

(56) References Cited

U.S. PATENT DOCUMENTS

| | | | |
|---|---|---|---|
| 6,196,790 B1 * | 3/2001 | Sheridan .............. F16J 15/3472 |
| | | | 415/231 |
| 6,409,469 B1 | 6/2002 | Tse | |
| 11,085,330 B2 | 8/2021 | Pankratov et al. | |
| 11,242,764 B2 * | 2/2022 | Smiddy ................. F01D 25/246 |
| 11,867,064 B1 * | 1/2024 | Sidorovich Paradiso ................... |
| | | | F16J 15/443 |
| 2011/0074115 A1 * | 3/2011 | Cohen Zada Vaizman ................. |
| | | | F16J 15/181 |
| | | | 277/513 |
| 2013/0241153 A1 | 9/2013 | Garrison | |
| 2013/0283757 A1 | 10/2013 | Bordne et al. | |
| 2018/0119557 A1 * | 5/2018 | Amador ............... F04D 29/321 |
| 2018/0363676 A1 | 12/2018 | Kroger et al. | |
| 2020/0116047 A1 | 4/2020 | Theratil et al. | |
| 2020/0132196 A1 * | 4/2020 | Davis .................... F01D 25/183 |
| 2021/0079802 A1 | 3/2021 | Smith et al. | |
| 2022/0221060 A1 * | 7/2022 | Obertanner ........... F04D 29/128 |

FOREIGN PATENT DOCUMENTS

WO      WO-2018061651 A1 *   4/2018

* cited by examiner

*Primary Examiner* — Gilbert Y Lee
(74) *Attorney, Agent, or Firm* — NORTON ROSE FULBRIGHT CANADA LLP

(57) ABSTRACT

A method of mitigating vibrations of a seal component of a bearing cavity, the method includes: injecting gas jets into the bearing cavity to disrupt vortices causing the vibrations of the seal component, the vortices having a frequency and an amplitude, the gas jets one or more of: decreasing the amplitude of the vortices; and modifying the frequency of the vortices to be offset from a natural frequency of the seal component.

20 Claims, 5 Drawing Sheets

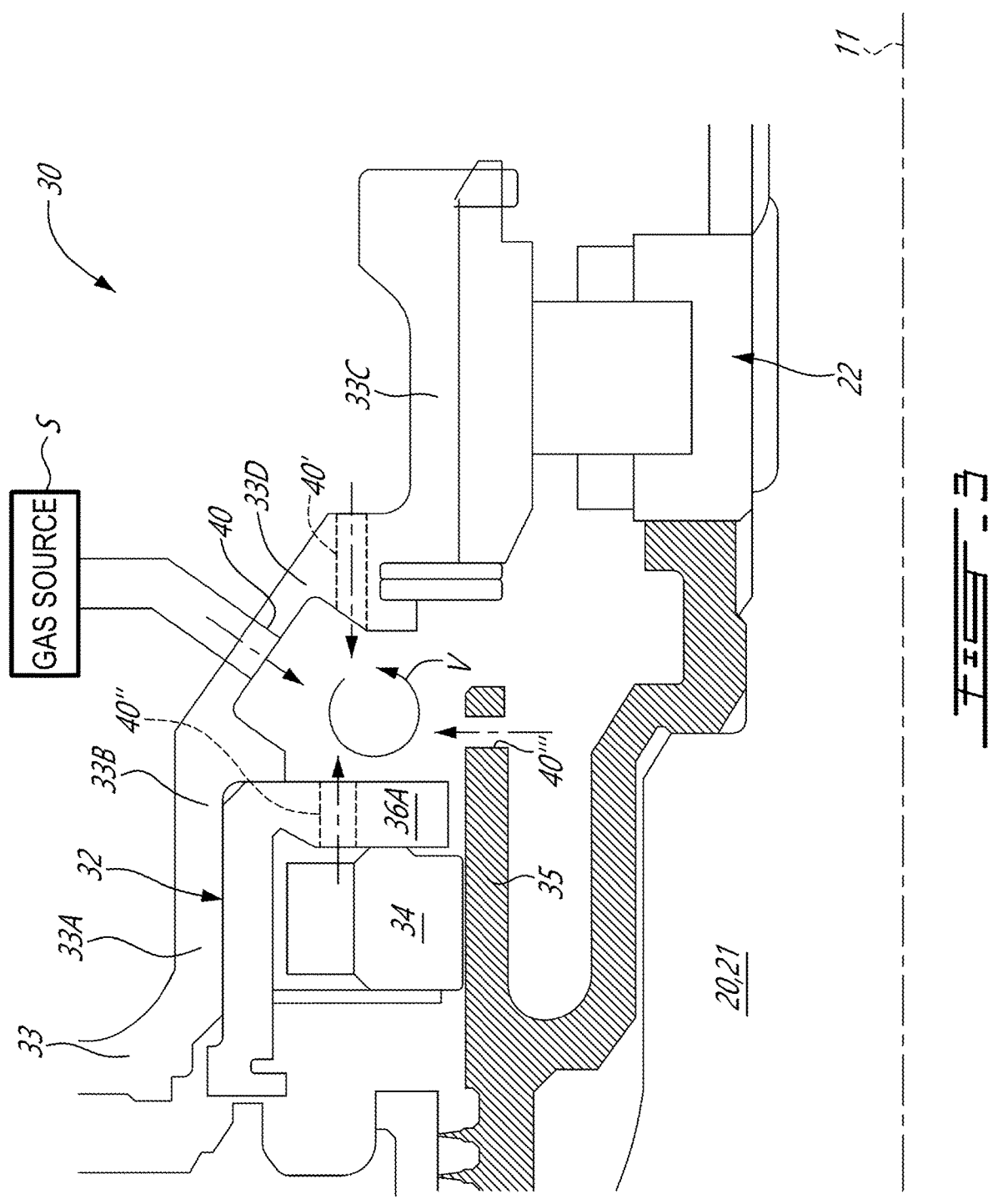
_FIG - 3_

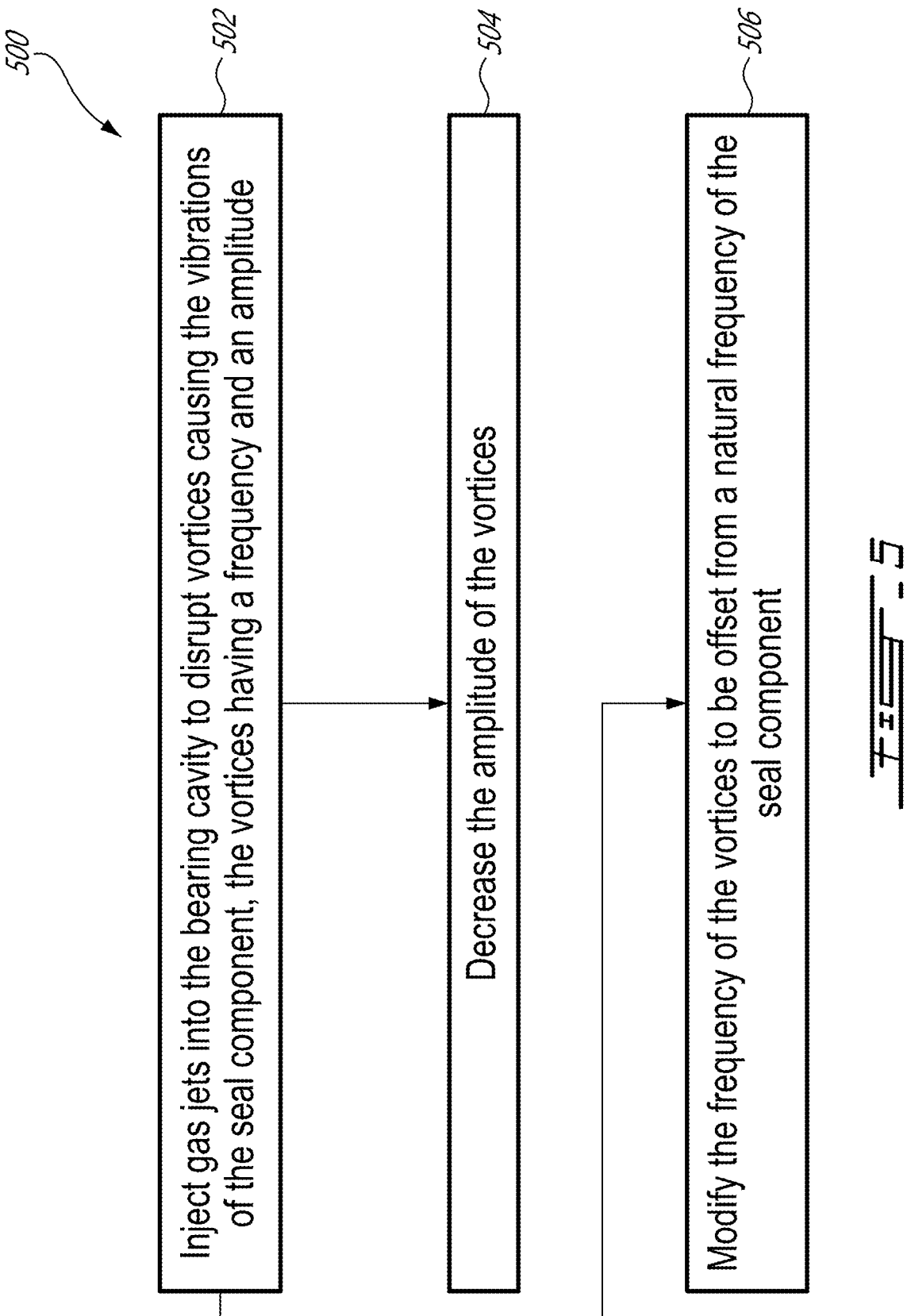
_FIG. 5_

METHOD OF MITIGATING VIBRATIONS IN A SEAL COMPONENT

TECHNICAL FIELD

The disclosure relates generally to aircraft engines, such as gas turbine engines and, more particularly, to seals for bearing cavities in such engines.

BACKGROUND

Controlled gap seals, such as carbon controlled gap seals, are commonly used in gas turbine engines, generally to seal bearing enclosures, also known as bearing cavities. These seals are designed to run with a tight clearance (e.g., a few thousands of an inch) between a stationary element and a rotating seal runner or shaft, or vice versa. A flow of air may develop within the bearing cavities, between two zones separated by the seal. In some cases, this flow of air may induce excitation of certain seal components. While existing seals and bearing cavities are suitable for their intended purposes, improvements are sought.

SUMMARY

In one aspect, there is provided a method of mitigating vibrations of a seal component of a bearing cavity, the method comprising: injecting gas jets into the bearing cavity to disrupt vortices causing the vibrations of the seal component, the vortices having a frequency and an amplitude, the gas jets one or more of: decreasing the amplitude of the vortices; and modifying the frequency of the vortices to be offset from a natural frequency of the seal component.

The method described above may include any of the following features, in any combinations.

In some embodiments, the injecting of the gas jets includes injecting the gas jets at a plurality of circumferential positions.

In some embodiments, the injecting of the gas jets at the plurality of the circumferential positions includes injecting the gas jets non-axisymmetrically.

In some embodiments, the injecting of the gas jets non-axisymmetrically includes varying one or more of: a mass flow rate of two adjacent gas jets of the gas jets; a velocity at which the two adjacent gas jets enters the bearing cavity; and a direction of injection of the two adjacent gas jets of the gas jets.

In some embodiments, the injecting of the gas jets at the plurality of the circumferential positions includes injecting the gas jets axisymmetrically.

In some embodiments, the injecting of the gas jets includes injecting the gas jets in a portion of the bearing cavity located axially between the seal component and a bearing.

In some embodiments, the injecting of the gas jets in the portion of the bearing cavity includes injecting the gas jets in a direction being substantially transverse to one or more of the vortices.

In some embodiments, the injecting of the gas jets includes injecting the gas jets via first nozzles and via second nozzles, a first nozzle of the first nozzles disposed circumferentially between two second nozzles of the second nozzles, a distance between the first nozzle and one of the two second nozzles different than a distance between the first nozzle and the other of the two second nozzles.

In some embodiments, the injecting of the gas jets includes injecting the gas jets via first nozzles and via second nozzles, the first nozzles having first exit flow axis extending along a first direction, the second nozzles having second exit flow axis extending along a second direction, the first direction different than the second direction.

In some embodiments, the injecting of the gas jets includes injecting the gas jets via first nozzles and via second nozzles, the first nozzles having a first flow circulating area, the second nozzles having a second flow circulating area, the first flow circulating area different than the second flow circulating area.

In some embodiments, the injecting of the gas jets includes injecting the gas jets via first nozzles and via second nozzles, the first nozzles having a first flow circulating area, the second nozzles having a second flow circulating area, a first shape of the first flow circulating area different than a second shape of the second flow circulating area.

In some embodiments, the injecting of the gas jets includes injecting the gas jets via nozzles being equally spaced apart from one another.

In another aspect, there is provided an aircraft engine, comprising: a shaft rotatable about a central axis; a bearing housing extending around the shaft and defining a bearing cavity; a seal disposed radially between the shaft and the bearing housing, the seal having a static component mounted to the bearing housing and a rotating component mounted to the shaft, a gap defined between the rotating component and the static component, the gap fluidly connecting the bearing cavity to an environment outside the bearing cavity; a gas source at a pressure greater than a pressure inside the bearing cavity; and nozzles distributed circumferentially around the central axis and fluidly connecting the gas source to the bearing cavity proximate the seal, the nozzles injecting jets of a gas from the gas source into the bearing cavity.

The aircraft engine described above may include any of the following features, in any combinations.

In some embodiments, the nozzles include first nozzles and second nozzles, a first nozzle of the first nozzles disposed circumferentially between two second nozzles of the second nozzles, a distance between the first nozzle and one of the two second nozzles different than a distance between the first nozzle and the other of the two second nozzles.

In some embodiments, the nozzles include first nozzles and second nozzles, the first nozzles having first exit flow axis extending along a first direction, the second nozzles having second exit flow axis extending along a second direction, the first direction different than the second direction.

In some embodiments, the nozzles include first nozzles and second nozzles, the first nozzles having a first flow circulating area, the second nozzles having a second flow circulating area, the first flow circulating area different than the second flow circulating area.

In some embodiments, the nozzles include first nozzles and second nozzles, the first nozzles having a first flow circulating area, the second nozzles having a second flow circulating area, a first shape of the first flow circulating area different than a second shape of the second flow circulating area.

In some embodiments, the nozzles are equally spaced apart from one another.

In some embodiments, the nozzles fluidly connect the gas source to a portion of the bearing cavity located axially between the seal and a bearing contained in the bearing cavity.

In some embodiments, the nozzles are defined through one or more of the bearing housing, the static component of the seal, and the rotating component of the seal.

DESCRIPTION OF THE DRAWINGS

Reference is now made to the accompanying figures in which:

FIG. 3 is an enlarged view of a portion of FIG. 2;

FIG. 5 is a flow chart illustrating steps of mitigating vibrations of a seal component.

DETAILED DESCRIPTION

Figure 1:
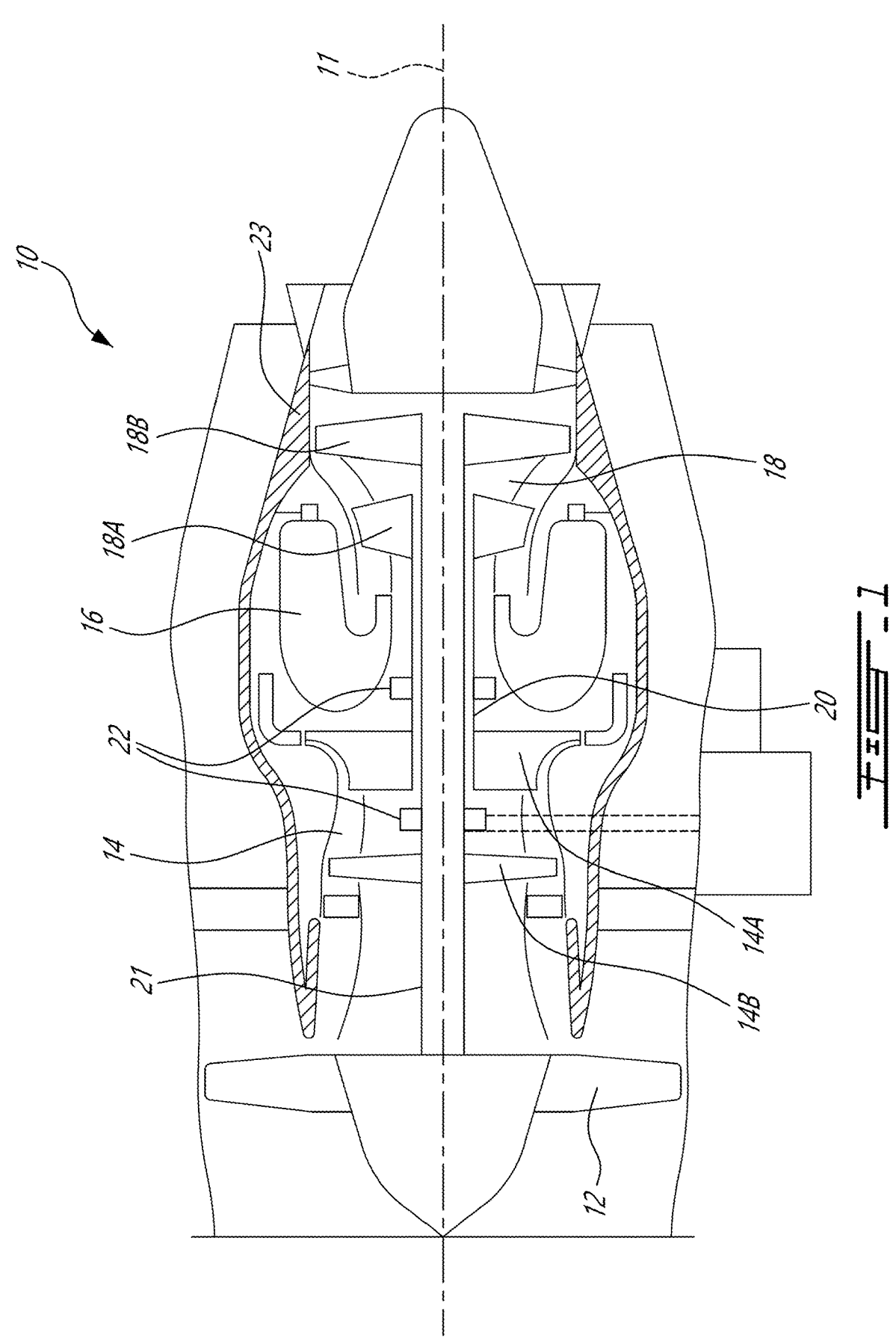
FIG. 1 is a schematic cross-sectional view of an aircraft engine depicted as a gas turbine engine.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10. In the embodiment shown, the gas turbine engine 10 comprises a high-pressure spool having a high-pressure shaft 20 drivingly engaging a high-pressure turbine 18A of the turbine section 18 to a high-pressure compressor 14A of the compressor section 14, and a low-pressure spool having a low-pressure shaft 21 drivingly engaging a low-pressure turbine 18B of the turbine section to a low-pressure compressor 14B of the compressor section 14 and drivingly engaged to the fan 12. It will be understood that the contents of the present disclosure may be applicable to any suitable engines, such as turboprops and turboshafts, and reciprocating engines, such as piston and rotary engines without departing from the scope of the present disclosure.

The gas turbine engine 10 can include a plurality of bearings 22 which are used to provide a low-friction interface between components which rotate relative to one another, such as between a high-pressure shaft 20 and an engine casing 23. Typically, bearings are enclosed in chambers referred to as bearing enclosures, bearing cavities, bearing compartments, among other names. The bearing cavities are partitioned from an environment outside of the bearing cavities by seals on each axial side. The seals cooperate with a bearing housing to delimit a bearing cavity.

Figure 2:
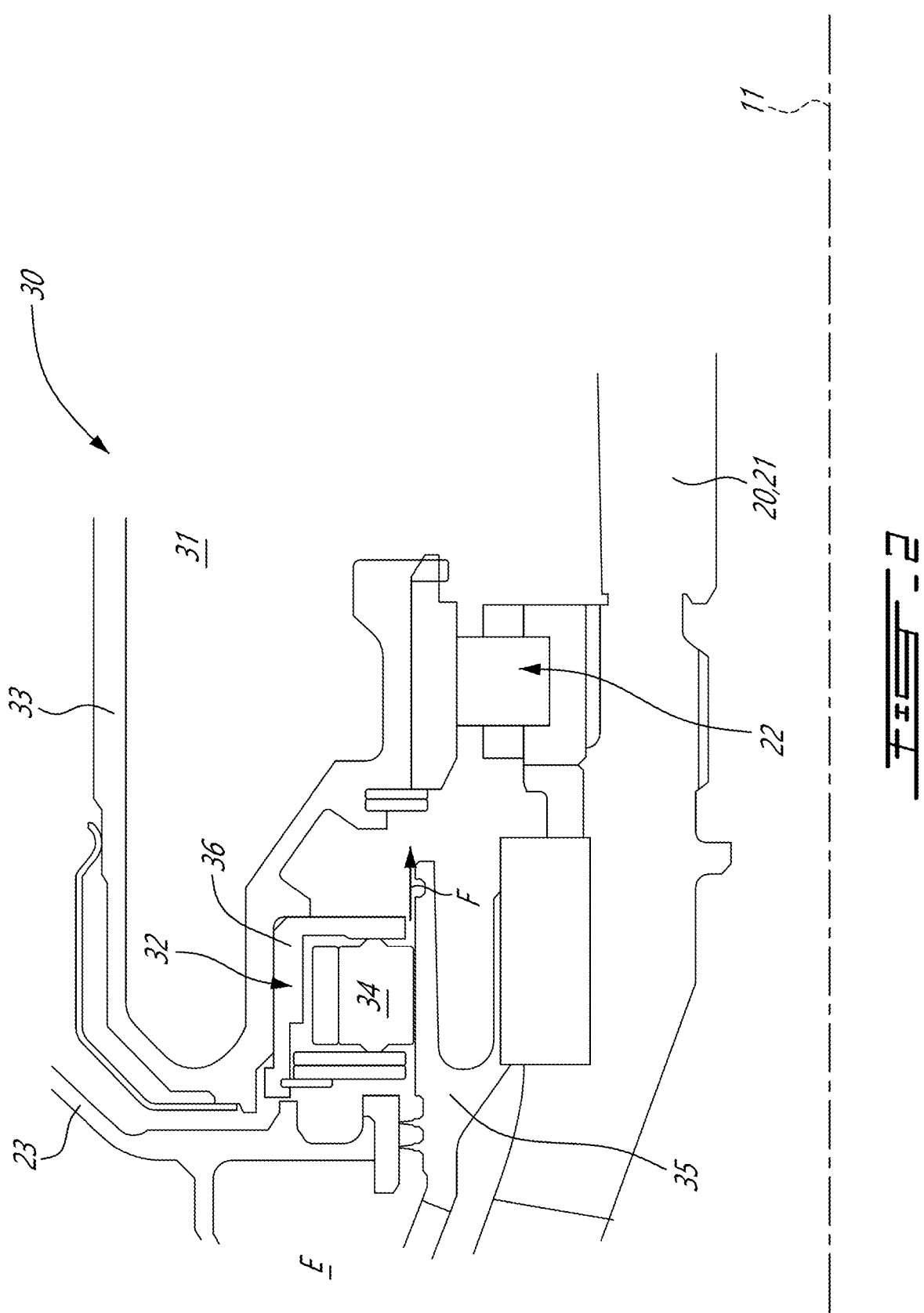
FIG. 2 is an enlarged cross-sectional view of a portion of the gas turbine engine of FIG. 1 in accordance with one embodiment.

Referring now to FIG. 2, a bearing assembly for the gas turbine engine is generally shown at 30. The bearing assembly 30 includes one or more of the bearings 22, only one shown in FIG. 2, but more bearings may be included in the bearing assembly 30, located radially inwardly to the engine casing 23 relative to the central axis 11 and located within a bearing cavity 31. The bearing cavity 31 is sealed from an environment E outside the bearing cavity 31 by seals 32 that may be located axially forward and aft of the bearing 22 relative to the central axis 11. In the embodiment shown, one or more of the seals are controlled gap seals. The seals 32 are configured to allow a flow of pressurized air from the environment E outside the bearing cavity 31 to the bearing cavity 31, as the seals 32 define a fluid passage where air may flow into the bearing cavity 31 along direction depicted by arrow F.

The bearing assembly 30 includes a bearing housing 33 that defines the bearing cavity 31. The bearing housing 33 extends all around the central axis 11 of the gas turbine engine 10. The bearing housing 33 is a static structure secured to the engine casing 23 and configured for containing a mixture of oil and air to lubricate the bearing 22 during use. The bearing housing 33 may be pressurized from the outside. Therefore, air may flow from the environment E into the bearing cavity 31 along the direction depicted by the arrow F to limit oil leakage out of the bearing cavity 31.

In the embodiment shown, the seals 32 are controlled gap seals, also referred to as carbon seals. However, other types of seals, such as labyrinth seals, may be used. The seals 32 are designed to maintain a controlled gap between static and rotating part. One of the seals 32 is described below using the singular form. The description may apply to both seals.

The controlled gap seal includes a static component, referred to below as a sealing ring 34 and a rotating component, referred to below as a seal runner 35. The seal runner 35 is secured to the shaft, which may correspond to either the high-pressure shaft 20 or the low-pressure shaft 21. The seal runner 35 defines a seal land that faces the sealing ring 34. The controlled gap is defined between a radially-inner face of the sealing ring 34 and a radially outer face of the seal runner 35. An opposite arrangement may be possible in some configurations. The sealing ring 34 may be housed in a housing 36 mounted to the bearing housing 33. The housing 36 may be an integral part of the bearing housing 33, in some embodiments.

The sealing ring 34 may be made of carbon, but other materials are contemplated. In the embodiment shown, a pressure differential between the environment E outside the bearing cavity 31 and the bearing cavity 31 is sufficient for maintaining the sealing ring 34 in abutment against the housing 36. However, a biasing member may be used to assist in biasing the sealing ring 34 against a radially-inwardly extending flange of the housing 36.

The seal 32 cooperates with the seal runner 35, that rotates about the central axis 11. It is understood that herein the expression runner may be either directed to an element secured to a rotating component of the gas turbine engine 10 or to the rotating component (e.g., shaft) itself.

A radial height of the controlled gap defined between the sealing ring 34 and the seal runner 35 allows a flow of pressurized air from the environment E outside the bearing cavity 31 to flow into the bearing cavity 31. In a particular embodiment, this flow of air may prevent or impede the lubricant from flowing from the bearing cavity 31 to the environment E outside the bearing cavity 31 via the controlled gap.

It has been observed that, in some particular operational conditions (e.g., rotational speed, pressures, etc.), the flow of the pressurized air through the controlled gap of the seal 32 may cause excitation of the seal runner 35 when the latter is in rotation about the central axis 11. In some circumstances, the excitation may cause premature wear of the seal runner 35 thereby decreasing its life span. The excitation may be caused by vortex shedding created by the flow of pressurized air. Vortex shedding correspond to an oscillating flow that takes place when a fluid (e.g., the pressurized air) passes a body at certain velocities. The vortex shedding has frequencies that might correspond to natural modes of the seal runner 35. The excitation may also be caused by vortices V (FIG. 3) in the bearing cavity 31 and caused by the air flowing through the gap into the bearing cavity 31. Therefore, it might be advantageous to disrupt the flow to change one or more of a frequency and amplitude of the vortices V located in the bearing cavity 31 proximate the seal runner 35.

Referring to FIG. 3, the bearing assembly 30 includes nozzles 40 distributed circumferentially around the central axis 11 and fluidly connecting a gas source S to the bearing cavity 31 proximate the seal 32. The nozzles 40 are configured to inject jets of a gas of the gas source into the bearing cavity 31. These jets may at least partially alleviate the aforementioned drawbacks. The gas source S may be the compressor section 14 of the gas turbine engine and the gas may be compressed air. A pressure of the gas source S may be greater than a pressure inside the bearing cavity 31. Suitable valving may be used to selectively fluidly connect or disconnect the gas source S from the bearing cavity 31. The gas source S may alternatively be a tank of a gas, such as air or other suitable inert gas. A dedicated air pump may be used to generate the jets.

The nozzles 40 are circumferentially offset from one another about the central axis 11. The nozzles 40 may be defined by apertures defined through the bearing housing 33. For instance, the nozzles 40 may be apertures defined through a flange 33A that extends axially relative to the central axis 11. The flange 33A may have a first section 33B that is axially overlapping the seal 32, a second section 33C that is axially overlapping the bearing 22 and that supports an outer race of the bearing 22, and a third section 33D that interconnects the first section 33B to the second section 33C. In the present embodiment, the nozzles 40 are defined through the third section 33D of the flange 33A. Alternatively, or in combination, nozzles 40' may be defined through the second section 33C of the flange 33A, nozzles 40" may be defined through a radially-inwardly extending flange 36A of the housing 36 of the seal 32, and/or nozzles 40''' may be defined through the seal runner 35. Any combination of these configurations may be used.

A shape of a conduit of the nozzles 40, defined by apertures through the bearing housing 33, may have a convergent shape, a divergent shape, or a convergent-divergent shape. In some embodiments, separate nozzle tips may be secured to the bearing housing 33 within the aperture defined therethrough. The nozzle tips may have outlet ends located inside the bearing cavity 31 to provide a more precise injection of the jets.

As will be discussed below with references to FIGS. 4A-4D, the nozzles 40 may be distributed in many ways and have varying configurations. The nozzles 40 fluidly connect the gas source S to a portion of the bearing cavity 31 located axially between the seal 32 and the bearing 22 contained in the bearing cavity 31. The nozzles 40 may be defined through one or more of the bearing housing 33, the static component of the seal, and the rotating component of the seal. The description below may thus apply to any of the nozzles 40, 40', 40", and 40'''.

Figures 4A, 4B, 4C, 4D:
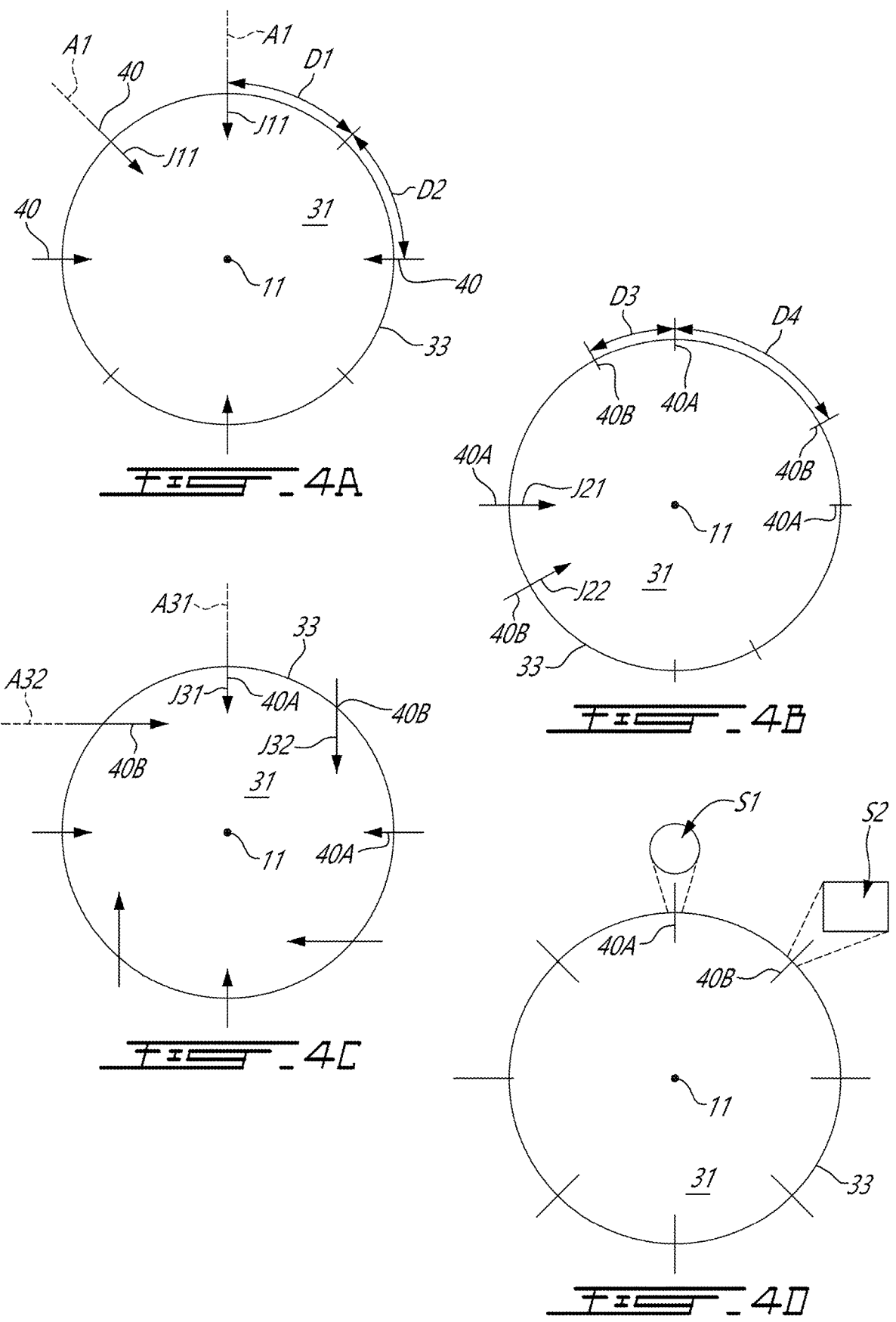
FIGS. 4A to 4D are schematic cross-sectional view taken on a plane normal to a central axis of the gas turbine engine and illustrating various injection patterns into a bearing cavity.

Referring now to FIG. 4A, a first configuration of the nozzles 40 is illustrated. In the exemplified embodiment, the nozzles 40 are distributed to define a first injection pattern. In this first injection pattern, the nozzles 40 are equidistantly spaced apart from one another. In other words, a first distance D1, taken in a circumferential direction, between a first nozzle of the nozzles 40 and a second nozzle of the nozzles 40 being circumferentially adjacent to the first nozzle is equal to a second distance D2 between the second nozzle and a third nozzle of the nozzles 40 being circumferentially adjacent to the second nozzle. The second nozzle is disposed between the first and third nozzles. In this configuration, the nozzles 40 inject first jets J11 of the gas that are all oriented in the same direction. Put differently, the nozzles 40 define first exit flow axis A1 that extend in a direction being the same for all nozzles 40. The exit flow axis A1 may have one or more of an axial component, a radial component, and a circumferential component relative to the central axis 11. These components may be the same for all of the nozzles 40. The injection pattern defined by this configuration may therefore be axisymmetric. Put differently, the first jets J11 are injected into the bearing cavity 31 in an axisymmetric manner.

Referring now to FIG. 4B, a second configuration of the nozzles 40 is shown and presents a second injection pattern. In this embodiment, the nozzles 40 include first nozzles 40A and second nozzles 40B. Each of the first nozzles 40A is disposed between two adjacent ones of the second nozzles 40B. In other words, a first nozzle of the first nozzles 40A is disposed circumferentially between two second nozzles of the second nozzles 40B. A third distance D3 between the first nozzle and one of the two second nozzles is different than a fourth distance D4 between the first nozzle and the other of the two second nozzles. Put differently, the first nozzles 40A may be equidistantly spaced apart from one another and the second nozzles 40B may also be equidistantly spaced apart from one another. The first nozzles 40A may be circumferentially offset from the second nozzles by an angle such that the second nozzles 40B are positioned offset from a central location between the first nozzles 40A.

The first nozzles 40A are configured to inject first jets J21 whereas the second nozzles 40B are configured to inject second jets J22. In one embodiment, the first nozzles 40A may inject the first jets J21 in a first direction whereas the second nozzles 40B may inject the second jets J22 in a second direction. The first direction may be the same as the second direction. Alternatively, the first direction may be different than the second direction. For instance, the first direction may include a first circumferential component being in a same direction of rotation of the seal runner 35 and the second direction may include a second circumferential component being in an opposite direction as the direction of rotation of the seal runner 35. The direction may be along a direction of the flow in the bearing cavity 31 or opposite the direction of the flow in the bearing cavity 31. The direction may be normal or at an angle relative to the flow direction. The first jets J21 may be stronger than the second jets J22. By "stronger", it is implied one or more of a greater mass flow rate and a greater velocity. The first jets J21 may have the same strength as the second jets J22. Differencing the jets by their strength may further help in disrupting the vortices V in the bearing cavity 31. The first nozzles 40A and the second nozzles 40B may provide mistuned jets Referring now to FIG. 4C, a third configuration of the nozzles 40 is shown and presents a third injection pattern. In this embodiment, the nozzles 40 include first nozzles 40A and second nozzles 40B. Each of the first nozzles 40A is disposed between two adjacent ones of the second nozzles 40B. In other words, a first nozzle of the first nozzles 40A is disposed circumferentially between two second nozzles of the second nozzles 40B. In this configuration, the nozzles 40 are equidistantly spaced from one another, but they may be disposed non-equidistantly as described above with reference to FIG. 4B. The first nozzles 40A having first exit flow axis A31 extending along a first direction and the second nozzles 40B having second exit flow axis A32 extending along a second direction. The first direction is different than the second direction. In other words, the first nozzles 40A inject first jets J31 along the first direction and the second nozzles 40B inject second jets J32 along the second direction. In this embodiment, the first exit flow axis A31 may be devoid of a circumferential component and the second exit flow axis A32 may have a circumferential component, which may be in the same direction or an opposite direction as the direction of rotation of the seal runner 35. In another embodiment, the first nozzles 40A may inject the first jets J31 along the first exit flow axis A31 having a circumferential component in the same direction as the direction of rotation of the seal runner 35 and the second nozzles 40B may inject the second jets J32 along the second exit flow axis A32 having a circumferential component in an opposite direction as the direction of rotation of the seal runner 35. In some embodiments, each of the nozzles 40 may inject a jet along a respective direction different from one another.

Referring now to FIG. 4D, a fourth configuration of the nozzles 40 is shown and presents a fourth injection pattern. In this embodiment, the nozzles 40 include first nozzles 40A and second nozzles 40B. Each of the first nozzles 40A is disposed between two adjacent ones of the second nozzles 40B. In other words, a first nozzle of the first nozzles 40A is disposed circumferentially between two second nozzles of the second nozzles 40B. In this configuration, the nozzles 40 are equidistantly spaced from one another, but they may be disposed non-equidistantly as described above with reference to FIG. 4B. In this embodiment, the first nozzles 40A have a first flow circulating area S1 and the second nozzles 40B have a second flow circulating area S2. The first flow circulating area S1 is different (e.g., bigger, smaller) different than the second flow circulating area S2.

The difference in flow circulating areas may be achieved by the first nozzles 40A and the second nozzles 40B having the same shape (e.g., circle, rectangle, square), but of a different size. For instance, if the shape is a circle, a diameter of the first nozzles 40A may be different than a diameter of the second nozzles 40B. Alternatively, the difference in flow circulating areas may be achieved by varying a shape of the first nozzles 40A and of the second nozzles 40B. As shown in FIG. 4D, the first nozzles 40A have a first flow circulating area S1 and the second nozzles 40B have a second flow circulating area S2. A first shape of the first flow circulating area S1 is different than a second shape of the second flow circulating area S2. The first nozzles 40A may have a flow circulating area shaped as a circle whereas the second nozzles 40B may have a flow circulating area shaped as a square. The circle and the square may define the same or a different flow circulating area. Any suitable shapes, such as, circle, square, rectangle, oval, ellipse, and so on is contemplated.

It will be appreciated that the nozzles 40 may be distributed in any suitable ways as described above with reference to FIGS. 4A-4D. In other words, any features described above may be combined. For instance, the nozzles 40 may be configured to inject jets having the same velocity, mass flow rate, direction, and be equidistantly spaced apart from one another. Alternatively, two adjacent nozzles 40 may vary by one or more of directions of their exit flow axes, their shapes, the velocities of the jets they inject, mass flow rates of the gas flowing through them, their shapes, a distance with a neighbouring one of the nozzles 40, and so on. In some configuration, the nozzles may include first, second, and third nozzles, each having their own distribution about the central axis, direction, shape, mass flow rate, velocity, and so on. Any suitable distribution of nozzles, such as A-B-A, A-B-C-A, A-A-B-B, A-A-B-B-C-C-A-A, and so on is contemplated, where "A", "B", "C" denote a specific nozzle having its own set of characteristics (e.g., angle, strength, shape, etc). More than three kind of nozzles may be used.

The jets may have equal strength while exiting from equal areas and same shapes to generate tuned jets targeting a specific frequency or engine order with magnitude or phase variation. Alternatively, the jets may be of equal strength from exiting from equal areas and same exit shapes to generate mistuned jets targeting a specific frequency or engine order with magnitude or phase variation. The jets described above may be used solely to disrupt the vortices V in the bearing cavity C. In other words, these jets may not have any cooling purposes. The jets may be free from interaction with components in need of cooling.

The disclosed bearing assembly 30 having the nozzles 40 may at least partially destroy the symmetric pattern of the vortices V generated which excite the seal runner 35 or other components of the seals 32. The vortices V have frequencies and these frequencies excite the seal 32. Air is injected into the bearing cavity 31 to disrupt the vortices V and generate broad band frequencies rather than distinct tones that may potentially interfere with natural modes of rotating and static parts of the seal 32. The jets may be introduced by the nozzles 40 in a symmetric manner or asymmetric manner to disrupt the frequencies and introduce new stronger tones that may not interfere with adjacent rotating or static parts. The pressure ratios of the jets may be adjusted to generate single tones or multiple tones to interfere with the tones of vortices generated.

Referring now to FIG. 5, a method for mitigating vibrations of a seal component within a bearing cavity is shown at 500. The method 500 includes injecting gas jets into the bearing cavity 31 to disrupt the vortices V causing the vibrations of the seal component (e.g., seal runner 35) at 502. The vortices V are typically unsteady phenomenon characterized by a frequency and an amplitude. The gas jets may therefore one or more of decrease the amplitude of the vortices V at 504, and modify the frequency of the vortices V to be offset from a natural frequency of the seal component at 506.

More specifically, if the frequency of the vortices V matches one of the natural frequencies of the seal runner 35, said seal runner 35 may enter in resonance. This may impair its life span. The jets may thus be used to disrupt the vortices V. In the present disclosure, the expression "disrupting" implies one or more of modifying the frequency and the amplitude of the vortices V. It may decrease the amplitude, increase or decrease the frequency up to a point where a mismatch between the frequency of the vortices V and the natural frequency of the seal component is sufficient to avoid resonance.

The injecting of the gas jets at 502 may include injecting the gas jets in a portion of the bearing cavity 31 between the seal 32 and the bearing 22 and may include injecting the gas jets in a direction being substantially transverse to one or more of the vortices. In other words, the gas jets may intersect the vortices, they may intersect a shear plane between two adjacent vortices, or both.

As illustrated in FIGS. 4A-4D, the injecting of the gas jets at 502 may include injecting the gas jets at a plurality of circumferential positions. As shown in FIG. 4A, the injecting of the gas jets at 502 includes injecting the gas jets via the nozzles 40 being equally spaced apart from one another.

The injecting of the gas jets 502 may include injecting the gas jets axisymmetrically. Alternatively, and as illustrated in FIGS. 4B-4D, the injecting of the gas jets non-axisymmetrically. This may be achieved by varying one or more of: a mass flow rate of two adjacent gas jets of the gas jets, a velocity at which the two adjacent gas jets enters the bearing cavity, and a direction of injection of the two adjacent gas jets of the gas jets.

As exemplified in FIG. 4B, the injecting of the gas jets at 502 includes injecting the gas jets via the first nozzles 40A and via the second nozzles 40B. A first nozzle of the first nozzles 40A is disposed circumferentially between two second nozzles of the second nozzles 40B. A distance between the first nozzle and one of the two second nozzles is different than a distance between the first nozzle and the other of the two second nozzles.

As shown in FIG. 4C, the injecting of the gas jets at 502 includes injecting the gas jets via first nozzles 40A and via second nozzles 40B. The first nozzles 40A having first exit flow axis J31 extending along a first direction and the second nozzles 40B having second exit flow axis J32 extending along a second direction different than the first direction.

As exemplified in FIG. 4D, the injecting of the gas jets at 502 includes injecting the gas jets via the first nozzles 40A and via the second nozzles 40B. The first nozzles 40A have a first flow circulating area and the second nozzles 40B have a second flow circulating area S2 different than the first flow circulating area S1. The first nozzles 40A may have a first flow circulating area S1 and the second nozzles 40B may have a second flow circulating area S2. A first shape of the first flow circulating area S1 may be different than a second shape of the second flow circulating area S2.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method of mitigating vibrations of a seal component of a seal of a bearing cavity, the method comprising:
   limiting oil leakage out of the bearing cavity by introducing air into the bearing cavity through the seal;
   injecting gas jets into the bearing cavity to disrupt vortices causing the vibrations of the seal component, the vortices having a frequency and an amplitude, including injecting the gas jets into the bearing cavity independently of the air introduced into the bearing cavity through the seal, the gas jets one or more of:
   decreasing the amplitude of the vortices; and
   modifying the frequency of the vortices to be offset from a natural frequency of the seal component.

2. The method of claim 1, wherein the injecting of the gas jets includes injecting the gas jets at a plurality of circumferential positions.

3. The method of claim 2, wherein the injecting of the gas jets at the plurality of circumferential positions includes injecting the gas jets non-axisymmetrically.

4. The method of claim 3, wherein the injecting of the gas jets non-axisymmetrically includes varying one or more of:
   a mass flow rate of two adjacent gas jets of the gas jets;
   a velocity at which the two adjacent gas jets enters the bearing cavity; and a direction of injection of the two adjacent gas jets of the gas jets.

5. The method of claim 2, wherein the injecting of the gas jets at the plurality of the circumferential positions includes injecting the gas jets axisymmetrically.

6. The method of claim 1, wherein the injecting of the gas jets includes injecting the gas jets in a portion of the bearing cavity located axially between the seal component and a bearing.

7. The method of claim 6, wherein the injecting of the gas jets in the portion of the bearing cavity includes injecting the gas jets in a direction being substantially transverse to one or more of the vortices.

8. The method of claim 1, wherein the injecting of the gas jets includes injecting the gas jets via first nozzles and via second nozzles, a first nozzle of the first nozzles disposed circumferentially between two second nozzles of the second nozzles, a distance between the first nozzle and one of the two second nozzles different than a distance between the first nozzle and the other of the two second nozzles.

9. The method of claim 1, wherein the injecting of the gas jets includes injecting the gas jets via first nozzles and via second nozzles, the first nozzles having first exit flow axis extending along a first direction, the second nozzles having second exit flow axis extending along a second direction, the first direction different than the second direction.

10. The method of claim 1, wherein the injecting of the gas jets includes injecting the gas jets via first nozzles and via second nozzles, the first nozzles having a first flow circulating area, the second nozzles having a second flow circulating area, the first flow circulating area different than the second flow circulating area.

11. The method of claim 1, wherein the injecting of the gas jets includes injecting the gas jets via first nozzles and via second nozzles, the first nozzles having a first flow circulating area, the second nozzles having a second flow circulating area, a first shape of the first flow circulating area different than a second shape of the second flow circulating area.

12. The method of claim 1, wherein the injecting of the gas jets includes injecting the gas jets via nozzles being equally spaced apart from one another.

13. An aircraft engine, comprising:
   a shaft rotatable about a central axis;
   a bearing housing extending around the shaft and defining a bearing cavity, the bearing cavity containing a bearing;
   a seal disposed radially between the shaft and the bearing housing, the seal having a static component mounted to the bearing housing and a rotating component mounted to the shaft, a gap defined between the rotating component and the static component, the gap fluidly connecting a volume on a first side of the seal to the bearing cavity on a second side of the seal, the bearing cavity in fluid communication with a source of compressed air via the gap for limiting oil leakage out of the bearing cavity;
   a gas source at a pressure greater than a pressure inside the bearing cavity; and
   nozzles distributed circumferentially around the central axis and fluidly connecting the gas source to the bearing cavity proximate the seal and independently of the gap, the nozzles having outlets located on the second side of the seal and exposed to the bearing cavity and injecting jets of a gas from the gas source into the bearing cavity, the nozzles being defined through the bearing housing.

14. The aircraft engine of claim 13, wherein the nozzles include first nozzles and second nozzles, a first nozzle of the first nozzles disposed circumferentially between two second nozzles of the second nozzles, a distance between the first nozzle and one of the two second nozzles different than a distance between the first nozzle and the other of the two second nozzles.

15. The aircraft engine of claim 13, wherein the nozzles include first nozzles and second nozzles, the first nozzles having first exit flow axis extending along a first direction, the second nozzles having second exit flow axis extending along a second direction, the first direction different than the second direction.

16. The aircraft engine of claim 13, wherein the nozzles include first nozzles and second nozzles, the first nozzles having a first flow circulating area, the second nozzles having a second flow circulating area, the first flow circulating area different than the second flow circulating area.

17. The aircraft engine of claim 13, wherein the nozzles include first nozzles and second nozzles, the first nozzles having a first flow circulating area, the second nozzles having a second flow circulating area, a first shape of the first flow circulating area different than a second shape of the second flow circulating area.

18. The aircraft engine of claim 13, wherein the nozzles are equally spaced apart from one another.

19. The aircraft engine of claim 13, wherein the nozzles fluidly connect the gas source to a portion of the bearing cavity located axially between the seal and the bearing contained in the bearing cavity.

20. The aircraft engine of claim 19, wherein the nozzles are defined through one or more of the bearing housing, the static component of the seal, and the rotating component of the seal.

* * * * *